United States Patent [19]

Palmer et al.

[11] Patent Number: 4,847,174
[45] Date of Patent: Jul. 11, 1989

[54] THERMALLY ACTUATED HYDROGEN SECONDARY BATTERY

[75] Inventors: David N. Palmer, Tolland; John S. Cartwright, Enfield; James K. O'Neill, Tolland, all of Conn.

[73] Assignee: Combustion Engineering, Inc., Windsor, Conn.

[21] Appl. No.: 809,898

[22] Filed: Dec. 17, 1985

[51] Int. Cl.$^4$ .................. H01M 6/36; H01M 6/16; H01M 4/58

[52] U.S. Cl. ...................... 429/112; 429/101; 429/206; 429/192; 429/218; 420/900

[58] Field of Search .............. 429/101, 112, 206, 218, 429/191, 192, 33, 221; 420/900; 423/138, 511

[56] References Cited

U.S. PATENT DOCUMENTS

| | | | |
|---|---|---|---|
| 2,933,547 | 4/1960 | Grubb | 429/192 X |
| 4,024,036 | 5/1977 | Nakarura et al. | 429/33 X |
| 4,107,395 | 8/1978 | Van Ommering | 429/101 X |
| 4,179,491 | 12/1979 | Howe et al. | 429/33 X |
| 4,216,274 | 8/1980 | Bruning et al. | 429/101 X |
| 4,357,401 | 11/1982 | Andre et al. | 429/192 |
| 4,551,400 | 11/1985 | Sapru et al. | 429/101 X |
| 4,576,883 | 3/1986 | Hope et al. | 429/192 |
| 4,599,297 | 6/1986 | Polak et al. | 429/33 X |
| 4,605,603 | 8/1986 | Kanda et al. | 429/101 X |

Primary Examiner—Stephen J. Kalafut
Attorney, Agent, or Firm—Brumbaugh, Graves, Donohue & Raymond

[57] ABSTRACT

A thermally actuated hydrogen secondary battery comprises an anode having a thermally actuated anode-active solid reversible hydrogen-containing inorganic compound which deintercalates hydrogen ions (H+) in a discharge cycle when exposed to thermal energy, a compatible gas-free electrolyte capable of transporting hydrogen ions (H+) between the anode and a cathode when the anode is exposed to thermal energy, and the cathode having a hydrogen ion-intercalatable cathode-active material which intercalates hydrogen ions (H+) in a discharge cycle when the anode is exposed to thermal energy.

42 Claims, No Drawings

THERMALLY ACTUATED HYDROGEN SECONDARY BATTERY

The present invention relates to a secondary (rechargeable) battery and more particularly to a thermally actuated or activated hydrogen secondary battery which operates on the principle of intercalation/deintercalation of hydrogen ions ($H^+$) or protons into/from the active materials of the two electrodes.

A secondary battery of the lead-acid type suffers from a number of drawbacks. Thus, its open current voltage, mid-range voltage and energy density are relatively low. Moreover, such a battery is relatively heavy and large.

It is the principal object of the present invention to provide a secondary battery, which compared to a lead-acid secondary battery, has a relatively high open current voltage, mid-range voltage and energy density and is relatively lightweight and smaller. A further object is to provide means for converting solar thermal energy or waste heat directly into electrical energy via an electrochemical reaction.

The secondary battery of the present invention is a thermally actuated hydrogen secondary battery which comprises (a) an anode having a thermally actuated anode-active solid reversible hydrogen-containing inorganic compound which deintercalates hydrogen ions ($H^+$) in a discharge cycle when exposed to thermal energy, (b) a compatible gas-free electrolyte capable of transporting hydrogen ions ($H^+$) between the anode and a cathode when the anode is exposed to thermal energy, and (c) the cathode having a hydrogen ion-intercalatable cathode-active material which intercalates hydrogen ions ($H^+$) in a discharge cycle when the anode is exposed to thermal energy.

Suitable thermally actuated anode-active solid reversible hydrogen-containing inorganic compounds are exemplified below. "Reversible" compounds are compounds which can deintercalate or release hydrogen ions ($H^+$) or protons when exposed to thermal energy in a discharge cycle of the battery leaving behind a host material which can intercalate or insert hydrogen ions ($H^+$) or protons when the thermal energy is removed and/or when electrical work is applied to the battery in a charge cycle.

| | | |
|---|---|---|
| Metal Hydrides | $NaH$, $MgH_2$, $CaH_2$, $LaH_2$, $UH_3$ | |
| Hydrides of Transition Metal Intermetallic Compounds | $VNbZr\ H_x$ | $x = 0.1$ to $4.0$ |
| | $LaNi_5H_x$ | $x = 0.1$ to $7.0$ |
| | $FeTiH_x$ | $x = 0.1$ to $2.0$ |
| | $SmCo_5H_x$ | $x = 0.1$ to $7.0$ |
| | $Mg_2NiH_x$ | $x = 0.1$ to $5.0$ |
| | $TiCr_2H_x$ | $x = 0.1$ to $6.0$ |
| | $CeNi_5H_x$ | $x = 0.1$ to $7.0$ |
| Hydrogen Intercalates of Transition Metal Sulfides | $H_xWS_2$ | $x = 0.1$ to $3.0$ |
| | $H_xCrS_4$ | $x = 0.1$ to $6.0$ |
| Hydrogen Intercalates of Transition Metal Oxides | $H_xV_6O_{13}$ | $x = 0.1$ to $8.0$ |
| | $H_xWO_3$ | $x = 0.1$ to $2.0$ |
| | $H_xV_2O_5$ | $x = 0.1$ to $5.0$ |
| | $H_xMoO_3$ | $x = 0.1$ to $3.0$ |
| | $H_xReO_3$ | $x = 0.1$ to $3.0$ |
| Hydrogen Intercalates of Transition Metal Halooxides | $H_xFeOCl$ | $x = 0.1$ to $4.0$ |
| | $H_xNiOCl$ | $x = 0.1$ to $5.0$ |
| | $H_xNiOCl_xF_{1-x}$ | $x = 0.1$ to $5.0$ |
| Hydrogen Intercalates of Transition Metal | $H_xWC_y$ | $x = 0.1$ to $5.0$; $y = 1$ to $3$ |
| | $H_xTaC_y$ | $x = 0.1$ to $5.0$; $y = 3$ to $5$ |
| Carbides | $H_xTiC_y$ | $x = 0.1$ to $3.0$; $y = 1$ to $3$ |
| Hydrogen Intercalates of Transition Metal Phosphosulfides | $H_xNiPS_3$ | $x = 0.1$ to $3.0$ |
| | $H_xCrPS_4$ | $x = 0.1$ to $3.0$ |
| Hydrogen Intercalates of Transition Metal Carbosulfides | $H_xTaC_2S_2$ | $x = 0.1$ to $3.0$ |

Suitable hydrogen ion-intercalatable cathode-active materials are exemplified below.

| | |
|---|---|
| Alkali, Alkaline Earth and Transition Metals | Na, Mg, Ca, La, U |
| Transition Metal Intermetallic Compounds | $VNbZr$, $LaNi_5$, $FeTi$, $SmCo_5$, $PrCo_5$, $NdCo_5$, $GdCo_5$, $PrNi_5$, $SmNi_5$, |
| Transition Metal Sulfides | $WS_2$, $CrS_4$ |
| Transition Metal Oxides | $V_6O_{13}$, $WO_3$, $V_2O_5$, $MoO_3$, $ReO_3$ |
| Transition Metal Halooxides | $FeOCl$, $NiOCl$, $NiOCl_xF_{1-x}$ $x = 0.1$ to $5.0$ |
| Transition Metal Carbides | $WC_y\ y = 1$ to $3$ $TaC_y\ y = 3$ to $5$ $TiC_y\ y = 1$ to $3$ |
| Transition Metal Phosphosulfides | $TiPS_3$, $NiPS_3$, $CrPS_3$, $CrPS_4$ |
| Transition Metal Carbosulfides | $TaC_2S_2$ |

The gas-free electrolyte or proton ionic conductor is either a liquid or a solid. Suitable gas-free liquid or solid electrolytes are exemplified below.

| Solvent | Solute |
|---|---|
| Liquid Electrolytes: | |
| Aqueous: water | Chloroplatinic Acid |
| | Perchloric Acid |
| | Phosphoric Acid |
| | Monocarbazic Acid ($N_2H_3COOH$) |
| Nonaqueous: aprotic solvent, e.g., propylene carbonate, dioxolane, sulfolane, 3-methyl sulfolane, liquid poly(dimethoxyethoxyethoxy) phosphazene | Methane Sulfonic Acid |
| | Toluene Sulfonic Acid |
| | Trifluoromethane Sulfonic Acid |
| Solid Electrolytes: | |
| Polymer Complex: | Complex of Trifluoromethane sulfonic acid ($CF_3SO_3H$) with a linear polymer, namely polyethylene oxide, polypropylene oxide, poly(diphenoxyphosphazene), poly(di[2(2-methoxyethoxy)ethoxy] phosphazene), poly(difluorophosphazene) or poly(difluoroalkoxyphosphazene) - all of which polymers are well known |
| Others: | $N_2H_2(COOH)_2$ dicarbazic acid |
| | $N_2H(COOH)_3$ tricarbazic acid |
| | $N_2(COOH)_4$ tetracarbazic acid |
| | $NaBH_4$ (sodium borohydride) |

The liquid electrolyte can be buffered. The solute in the above nonaqueous liquid electrolytes can bear n-butyl, isobutyl, sec-butyl or similar functional group substitutions. The electrolyte must be a "compatible electrolyte", i.e., it must not cause the decomposition of the anode-active or cathode-active materials. For example, an aqueous electrolyte would not be used with a $NaH$ or a $MgH_2$ anode-active material, because $NaH$ (sodium hydride) and $MgH_2$ (magnesium hydride) decompose in water.

The polymer complex solid electrolyte can be prepared by dissolution of $CF_3SO_3H$ and the linear polymer in tetrahydrofuran as a mutual solvent (distilled from sodium benzophenone) and evaporation of the solvent to form a thin film using a mole ratio of about 0.25–5.1 of $H^+$ cations of the $CF_3SO_3H$ to one mole of the repeat unit of the phosphazene polymer and a mole ratio of about 0.10–5.1 of $H^+$ cations of the $CF_3SO_3H$ to one mole of the repeat unit of the polyalkylene oxide polymer. Repeat unit mole is equivalent to the molecular weight of the polymer repeat unit, e.g., $-\!\!+\!\!CH_2CH_2O\!\!+\!\!_n$ using polyethylene oxide as an example or $-\!\!+\!\!N=P$ (OEt OEt OMe)$_2\!\!+\!\!_n$ using poly(di[2(2-methoxyethoxy)ethoxy]phosphazene as an example. The polymer complex of poly(di[2-(2-methoxyethoxy)ethoxy]-phosphazene) is used in cells operating at temperatures between about 10° C.–100° C., while the other polymer complexes can be substituted therefor in cells operating at temperatures between about 100° C.–150° C. These polymer complexes are proton ionic conductors due to the mobile hydrogen cation ($H^+$) or proton and the mobile anion ($CF_3SO_3^-$) and hence they provide a path between the electrodes for the migration of deintercalated hydrogen ions or protons.

In a preferred embodiment of the invention, the anode and cathode have catalytic films thereon which improve charge transfer kinetics. Such catalytic films are made of an oxide, such as ruthenium dioxide ($RuO_2$), rhenium dioxide ($ReO_2$) or iridium dioxide ($IrO_2$), and/or a metal, such as palladium (Pd) or platinum black (Pt).

In the anode and cathode of the secondary battery, the cathode-active material can be codispersed with a carbon black depolarizer using an EPDM (ethylene-propylene-diene monomer) or TFE (tetrafluoroethylene) binder with a final configuration of the electrode in a retriculated foam (80%–97% open porosity) or the anode-active and cathode-active materials can be applied to the surface of a foam or retriculated metal-like current collector, such as a platinum-plated nickel foam of 3% density. In operation of the secondary battery, both the anode and cathode are ohmically connected to the external circuit through the porous current collector by means that avoid rectifying diode behavior.

The secondary battery has an anode and a cathode, both preferably having catalytic films thereon, with the gas-free liquid or solid electrolyte or proton ionic conductor therebetween. The optional catalytic films, which can be formed by evaporation of tetrahydrofuran slurries thereof, can be bindered to the electrodes by the same polymer complex material used in making the solid electrolyte. The electrodes are separated by a cell separator to prevent ohmic contact between the electrodes. These components are enclosed within an envelope. The envelope at least adjacent the anode is made of a heat-absorbant material, such as pyrolytic grade graphite or reduced metal intercalate of graphite, so that the anode can be thermally actuated during discharge.

These secondary batteries are actuated in the discharge cycle by impinging thermal energy (heat) onto the anode or onto the total cell, such as thermal energy from waste heat or solar thermal irradiation. Laser energy or microwave energy can also be used. The thermal energy input is either ambient incident irradiation or concentrated above ambient energy. The cells having a liquid electrolyte or a solid electrolyte are actuated and discharge at cell operating temperatures between 40° C.–50° C. or between 10° C.–150° C., respectively. The cells are charged in the charge cycle by the removal of thermal energy (heat) and/or by the addition of electrical work. During discharging, hydrogen ions ($H^+$) or protons are deintercalated or released from the anode-active material and intercalated (inserted or topotactically reacted) into the cathode-active material; during charging, the reverse reaction occurs, i.e., hydrogen ions ($H^+$) or protons are deintercalated or released from the original cathode-active material and intercalated (inserted or topotactically reacted) into the original anode-active material.

The principles of operation of the thermally actuated hydrogen secondary battery are illustrated by the following half cell and overall cell discharge cycle reactions for a cell having a gas-free liquid or solid electrolyte or proton ionic conductor, a $VNbZrH_3$ anode and a $V_6O_{13}$ cathode.

At Anode: 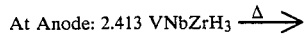

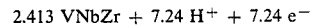

At Cathode: 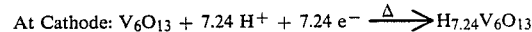

The overall cell discharge cycle reaction for this cell is:

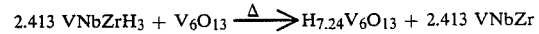

With the removal of heat ($-\Delta$) and/or the application of electrical work, the following reverse half cell and overall cell charge cycle reactions occur:

at the $H_{7.24}V_6O_{13}$ Electrode (original cathode during discharge):

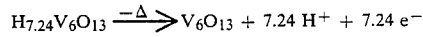

at the 2.413 VNbZr Electrode (original anode during discharge):

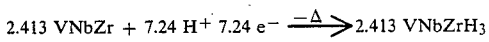

overall cell charge cycle reaction:

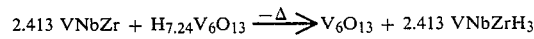

Overall cell discharge cycle reactions and calculated energy density for various exemplary thermally actuated hydrogen secondary batteries of the invention are as follows:

|  | Calculated Energy Density (W-Hrs/kg) |
|---|---|
| 2.413 $VNbZrH_3$ + $V_6O_{13}$ $\xrightarrow{\Delta}$ $H_{7.24}V_6O_{13}$ + 2.413 VNbZr | 1738 |

-continued

| | Calculated Energy Density (W-Hrs/kg) |
|---|---|
| $1.21\ LaNi_5H_6 + V_6O_{13} \xrightarrow{\Delta} H_{7.26}V_6O_{13} + 1.21\ LaNi_5$ | 693.96 |
| $7.24\ FeTiH + V_6O_{13} \xrightarrow{\Delta} H_{7.24}V_6O_{13} + 7.24\ FeTi$ | 1057.4 |
| $1.21\ SmCo_5H_6 + V_6O_{13} \xrightarrow{\Delta} H_{7.26}V_6O_{13} + 1.21\ SmCo_5$ | |
| $2.413\ Mg_2NiH_3 + V_6O_{13} \xrightarrow{\Delta} H_{7.24}V_6O_{13} + 2.413\ Mg_2Ni$ | 1051.9 |
| $2.413\ TiCr_2H_3 + V_6O_{13} \xrightarrow{\Delta} H_{7.24}V_6O_{13} + 2.413\ TiCr_2$ | 980.2 |
| $1.5\ FeTiH_2 + V_2O_5 \xrightarrow{\Delta} H_3V_2O_5 + 1.5\ FeTi$ | 1941.6 |
| $1.21\ CeNi_5H_6 + V_6O_{13} \xrightarrow{\Delta} H_{7.24}V_6O_{13} + 2.413\ CeNi_5$ | |
| $1.33\ VNbZrH_3 + V_2O_5 \xrightarrow{\Delta} H_4V_2O_5 + 1.33\ VNbZr$ | |
| $0.2\ VNbZrH_3 + WO_3 \xrightarrow{\Delta} H_{0.6}WO_3 + 0.2\ VNbZr$ | |
| $0.67\ VNbZrH_3 + MoO_3 \xrightarrow{\Delta} H_2MoO_3 + 0.67\ VNbZr$ | |
| $0.453\ VNbZrH_3 + ReO_3 \xrightarrow{\Delta} H_{1.36}ReO_3 + 0.453\ VNbZr$ | |

With the removal of the heat ($-\Delta$) and/or the application of electrical work, the reverse charge cycle reactions occur.

The above calculation of the cell energy density is accomplished by the following relationship:

| | |
|---|---|
| $E_D(W-hrs/kg) =$ | $[(MRV)(F)(t_k)(n)]/[A_{(wgt)} + C_{(wgt)}]$ |
| where $E_D =$ | cell energy density at the end of a discharge in $W - hrs/kg$ |
| $MRV =$ | cell midrange voltage (volts) |
| $F =$ | chemical Faraday's constant (96,486 coulombs/equivalent) |
| $t_k =$ | a conversion factor for seconds to hours = $2.78 \times 10^{-4}$ |
| $n =$ | number of equivalents transferred |
| A wgt $=$ | anode molecular weight in kgs. |
| C wgt $=$ | cathode molecular weight in kgs. |

The MRV is normally defined from a cell discharge curve.

The advantages of the thermally actuated hydrogen secondary battery of the invention over the conventional lead-acid storge battery are tabulated below.

| | Hydrogen Battery | Lead-Acid Battery |
|---|---|---|
| Open Circuit Voltage (volts versus normal hydrogen electrode) | up to +5.1 | −1.2 (maximum) |
| Midrange Voltage (volts versus normal hydrogen electrode) | +3.4 to 2.8 | −0.8 to −0.6 |
| Energy Density (W/hrs/kg) | ~700 to ~2000 | 30-62 |
| Relative Weight Ratio (Hydrogen/Lead Acid) | 0.10 to 0.25 | 1.0 |
| Relative Volume Ratio (Hydrogen/Lead Acid) | 0.15 to 0.30 | 1.0 |
| Operating Range | 40° C. to 50° C. nominal (liquid) 10° C. to 150° C. (solid) | −10° C. to 50° C. |
| Electrolyte Media | liquid or solid | liquid or gel |

A thermally actuated hydrogen secondary battery designed and fabricated to deliver 12 volts can contain 30% the number of cells, typically weigh 5%-25% as much, occupy 10%-30% the volume and deliver twelve times the energy density of a lead-acid battery.

The thermally actuated hydrogen secondary battery of the invention can be used for converting solar thermal energy or waste heat into electrical energy, for utility load levelling, in electrical vehicles and in military applications. The device of the invention can also be used as an electrochemical sensor for the determination of hydrogen if a metallic electrode is substituted for the reversible hydrogen-containing inorganic compound or can function as an electrochemical sensor for the determination of temperature, with presently indicated cathodes, by the direct relationship between temperature and hydrogen ion ($H^+$) activity as reflected by the change in potential of the cell in the 30° C. to 250° C. temperature range. As a sensor the cell can be miniaturized and placed on an integrated circuit chip and used as a smart sensor.

What is claimed is:

1. A thermally actuated hydrogen secondary battery which comprises (a) an anode having a thermally actuated anode-active solid reversible hydrogen-containing inorganic compound which deintercalates hydrogen ions (H+) in a discharge cycle when exposed to thermal energy, (b) a compatible gas-free electrolyte capable of transporting hydrogen ions (H+) between the anode and a cathode when the anode is exposed to thermal energy, and (c) the cathode having a hydrogen ion-intercalatable cathode-active material which intercalates hydrogen ions (H+) in a discharge cycle when the anode is exposed to thermal energy.

2. A secondary battery according to claim 1 wherein the thermally actuated anode-active solid reversible hydrogen-containing inorganic compound is a metal hydride.

3. A secondary battery according to claim 1 wherein the thermally actuated anode-active solid reversible hydrogen-containing inorganic compound is a hydride of a transition metal intermetallic compound.

4. A secondary battery according to claim 1 wherein the thermally actuated anode-active solid reversible hydrogen-containing inorganic compound is a hydrogen intercalate of a transition metal sulfide.

5. A secondary battery according to claim 1 wherein the thermally actuated anode-active solid reversible hydrogen-containing inorganic compound is a hydrogen intercalate of a transition metal oxide.

6. A secondary battery according to claim 1 wherein the thermally actuated anode-active solid reversible hydrogen-containing inorganic compound is a hydrogen intercalate of a transition metal halooxide.

7. A secondary battery according to claim 1 wherein the thermally actuated anode-active solid reversible hydrogen-containing inorganic compound is a hydrogen intercalate of a transition metal carbide.

8. A secondary battery according to claim 1 wherein the thermally actuated anode-active solid reversible hydrogen-containing inorganic compound is a hydrogen intercalate of a transition metal phosphosulfide.

9. A secondary battery according to claim 1 wherein the thermally actuated anode-active solid reversible hydrogen-containing inorganic compound is a hydrogen intercalate of a transition metal carbosulfide.

10. A secondary battery according to claim 1 wherein the hydrogen ion-intercalatable cathode-active material is an alkali metal.

11. A secondary battery according to claim 1 wherein the hydrogen ion-intercalatable cathode-active material is an alkaline earth metal.

12. A secondary battery according to claim 1 wherein the hydrogen ion-intercalatable cathode-active material is a transition metal.

13. A secondary battery according to claim 1 wherein the hydrogen ion-intercalatable cathode-active material is a transition metal intermetallic compound.

14. A secondary battery according to claim 1 wherein the hydrogen ion-intercalatable cathode-active material is a transition metal sulfide.

15. A secondary battery according to claim 1 wherein the hydrogen ion-intercalatable cathode-active material is a transition metal oxide.

16. A secondary battery according to claim 1 wherein the hydrogen ion-intercalatable cathode-active material is a transition metal halooxide.

17. A secondary battery according to claim 1 wherein the hydrogen ion-intercalatable cathode-active material is a transition metal carbide.

18. A secondary battery according to claim 1 wherein the hydrogen ion-intercalatable cathode-active material is a transition metal phosphosulfide.

19. A secondary battery according to claim 1 wherein the hydrogen ion-intercalatable cathode-active material is a transition metal carbosulfide.

20. A secondary battery according to claim 1 wherein the gas-free electrolyte is a liquid.

21. A secondary battery according to claim 1 wherein the gas-free electrolyte is a solid.

22. A secondary battery according to claim 21 wherein the solid electrolyte is a polymer complex of trifluormethane sulfonic acid with a linear polymer.

23. A secondary battery according to claim 22 wherein the linear polymer is polyethylene oxide.

24. A secondary battery according to claim 22 wherein the linear polymer is polypropylene oxide.

25. A secondary battery according to claim 22 wherein the linear polymer is poly(diphenoxyphosphazene).

26. A secondary battery according to claim 22 wherein the linear polymer is poly(di[2(2-methoxyethoxy)ethoxy]phosphazene).

27. A secondary battery according to claim 22 wherein the linear polymer is poly(diflurophosphazene).

28. A secondary battery according to claim 22 wherein the linear polymer is poly(difluoroalkoxyphosphazene).

29. A secondary battery according to claim 1 wherein the anode and cathode have catalytic films thereon which improve charge transfer kinetics.

30. A secondary battery according to claim 29 wherein the catalytic films on the anode and cathode comprise an oxide selected from the group consisting of ruthenium dioxide, rhenium dioxide and iridium dioxide.

31. A secondary battery according to claim 29 wherein the catalytic films on the anode and cathode comprise a metal selected from the group consisting of palladium and platinum black.

32. A secondary battery according to claim 29 wherein the thermally actuated anode-active solid reversible hydrogen-containing inorganic compound is $VNbZrH_3$ and the hydrogen ion-intercalatable cathode-active material is $V_6O_{13}$.

33. A secondary battery according to claim 29 wherein the thermally actuated anode-active solid reversible hydrogen-containing inorganic compound is $LaNi_5H_6$ and the hydrogen ion-intercalatable cathode-active material is $V_6O_{13}$.

34. A secondary battery according to claim 29 wherein the thermally actuated anode-active solid reversible hydrogen-containing inorganic compound is $FeTiH$ and the hydrogen ion-intercalatable cathode-active material is $V_6O_{13}$.

35. A secondary battery according to claim 29 wherein the thermally actuated anode-active solid reversible hydrogen-containing inorganic compound is $SmCo_5H_6$ and the hydrogen ion-intercalatable cathode-active material is $V_6O_{13}$.

36. A secondary battery according to claim 29 wherein the thermally actuated anode-active solid reversible hydrogen-containing inorganic compound is $Mg_2NiH_3$ and the hydrogen ion-intercalatable cathode-active material is $V_6O_{13}$.

37. A secondary battery according to claim 29 wherein the thermally actuated anode-active solid reversible hydrogen-containing inorganic compound is $TiCr_2H_3$ and the hydrogen ion-intercalatable cathode-active material is $V_6O_{13}$.

38. A secondary battery according to claim 29 wherein the thermally actuated anode-active solid reversible hydrogen-containing inorganic compound is $CeNi_5H_6$ and the hydrogen ion-intercalatable cathode-active material is $V_6O_{13}$.

39. A secondary battery according to claim 29 wherein the thermally actuated anode-active solid reversible hydrogen-containing inorganic compound is $VNbZrH_3$ and the hydrogen ion-intercalatable cathode-active material is $V_2O_5$.

40. A secondary battery according to claim 29 wherein the thermally actuated anode-active solid reversible hydrogen-containing inorganic compound is $VNbZrH_2$ and the hydrogen ion-intercalatable cathode-active material is $WO_3$.

41. A secondary battery according to claim 29 wherein the thermally actuated anode-active solid reversible hydrogen-containing inorganic compound is $VNbZrH_3$ and the hydrogen ion-intercalatable cathode-active material is $MoO_3$.

42. A secondary battery according to claim 29 wherein the thermally actuated anode-active solid reversible hydrogen-containing inorganic compound is $VNbZrH_3$ and the hydrogen ion-intercalatable cathode-active material is $ReO_3$.

* * * * *

UNITED STATES PATENT AND TRADEMARK OFFICE
CERTIFICATE OF CORRECTION

PATENT NO. : 4,847,174

DATED : July 11, 1989

INVENTOR(S) : David N. Palmer et al.

It is certified that error appears in the above-identified patent and that said Letters Patent is hereby corrected as shown below:

First page, 2nd col., 4th line, "4,599,297" should read
-- 4,594,297 --;

First page, 2nd col., following 5th line, insert:
-- FOREIGN PATENT DOCUMENTS
156,241    10/1985    European Patent Office

OTHER PUBLICATIONS

Chemical Abstracts: 92:166405K (1980) and
97:147565Z (1982) --;

Col. 3, line 14, "phosphazene" should read -- phosphazene)--;

Col. 3, line 37, "retriculated" should read -- reticulated --;

line 39, "retriculated" should read -- reticulated --;

Col. 5, line 43, "Fraday's" should read -- Faraday's --;

Col. 8, line 16, "trifluormethane" should read
-- trifluoromethane --;

Col. 8, line 29, "poly(diflurophospha-" should read
-- poly(difluorophospha- --; and

UNITED STATES PATENT AND TRADEMARK OFFICE
CERTIFICATE OF CORRECTION

PATENT NO. : 4,847,174

DATED : July 11, 1989

INVENTOR(S) : David N. Palmer et al

It is certified that error appears in the above-identified patent and that said Letters Patent is hereby corrected as shown below:

Col. 10, line 6, "$VNbZrH_2$" should read --$VNbZrH_3$--.

Signed and Sealed this

Eighth Day of May, 1990

*Attest:*

HARRY F. MANBECK, JR.

*Attesting Officer*  *Commissioner of Patents and Trademarks*